United States Patent [19]

Kishi et al.

[11] 4,121,264
[45] Oct. 17, 1978

[54] METHOD FOR RECORDING INFORMATION SIGNAL AND CONTROL SIGNAL

[75] Inventors: Yoshio Kishi, Tokyo; Masaru Nagami, Yokohama, both of Japan

[73] Assignee: Sony Corporation, Tokyo, Japan

[21] Appl. No.: 762,767

[22] Filed: Jan. 26, 1977

[30] Foreign Application Priority Data

Jan. 26, 1976 [JP] Japan .............................. 51-7428[U]

[51] Int. Cl.² ...................... G11B 15/02; G11B 23/18
[52] U.S. Cl. ...................................... 360/55; 360/27; 360/71; 360/79
[58] Field of Search .................. 360/55, 27, 122, 124, 360/79, 80, 78, 71–74, 77, 61–64, 12

[56] References Cited

U.S. PATENT DOCUMENTS

| | | | |
|---|---|---|---|
| 3,292,168 | 12/1966 | Gray | 360/78 |
| 3,469,037 | 9/1969 | Camras | 360/122 |
| 3,539,734 | 11/1970 | Tsuchiya | 360/74 |
| 3,587,180 | 6/1971 | Richt | 360/74 |
| 3,591,730 | 7/1971 | Chang | 360/79 |
| 3,702,908 | 11/1972 | Sugiura | 360/74 |
| 3,812,533 | 5/1974 | Kimura | 360/78 |
| 3,869,720 | 3/1975 | Ohira | 360/79 |
| 3,919,697 | 11/1975 | Walker | 360/78 |

OTHER PUBLICATIONS

Sound Recording – John Eargle; Van Nostrand Reinhold Co.; New York 1976, Standards shown on p. 230ff.
"Reel to Reel Cassette," Radio Electronics Magazine, p. 48ff, Oct. 1976.

*Primary Examiner*—Jay P. Lucas
*Attorney, Agent, or Firm*—Lewis H. Eslinger; Alvin Sinderbrand

[57] ABSTRACT

A first main information signal is recorded in a first track extending longitudinally along one side of a length of magnetic tape and a corresponding first secondary, or control, signal is recorded in a narrow parallel track spaced from the first main track. A second main signal is recorded in a third track within the other half of the tape, and a corresponding second secondary, or control, signal is recorded between the first secondary signal and the first main signal, whereby the two main signals and the two secondary signals are interleaved with each other. The first and second main tracks are equal in width, and the first and second secondary tracks are also equal in width but are much narrower than the first and second main tracks. If desired, the first and second main tracks can each be divided into first and second sub-main tracks to permit two channel recording with a control track in each direction but with each control, or secondary, track being separated from its own nearest subtrack by a distance equal to the width of the other secondary track plus two guardbands, one on each side of the other secondary track.

7 Claims, 7 Drawing Figures

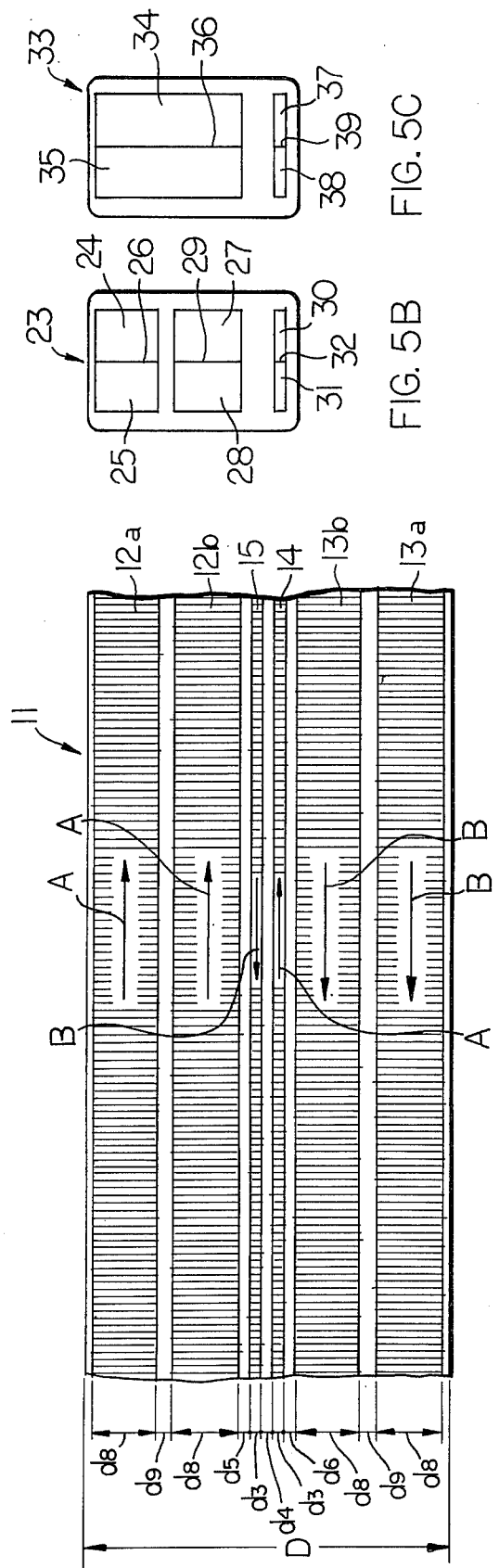

METHOD FOR RECORDING INFORMATION SIGNAL AND CONTROL SIGNAL

BACKGROUND OF THE INVENTION

1. Field of the Invention

This invention relates to a method and apparatus for recording information signals and related secondary signals in parallel tracks on a magnetic recording medium. In particular, it relates to a method and apparatus for recording one set of main and secondary signals on a first main and a first secondary track parallel to each other and spaced apart from each other and interleaved with a second main and a second secondary track on which a second information signal and a second related signal is recorded, respectively. The secondary track related to a second main track is recorded between the first main track and the first secondary track related thereto, so that both secondary tracks are between their related main tracks.

2. The Prior Art

In certain types of magnetic tape equipment, a main signal is recorded simultaneously with a secondary signal. The secondary signal is frequently referred to as a control signal and contains control information, such as pulses corresponding to blocks of information in the information signals to allow a counting mechanism to count the number of such pulses in order to move the tape to desired locations thereon to pick up information recorded at such locations. Due to the fact that the secondary signals contain relatively little information, they do not require as much tape width as the main signals recorded simultaneously.

In some conventional tape recorders the control signals are recorded in very narrow tracks at the edges of the tape. Each main signal and the control, or secondary, signal associated therewith are recorded on slightly less than one half the total tape width with the tape moving in one direction. The other half of the tape has another main signal and another control signal recorded on it with the tape moving in the opposite direction. The arrangement of recording tracks in which the signals are recorded is symmetrical about the center line of the tape. As a result, if the moving tape fluctuates a small amount in the transverse direction while it is being pulled in the longitudinal direction, the pick up head that should respond to the narrow track of the recorded control signals may be shifted away from that track, thus making the control track operation unstable. To make matters worse, the head may disengage entirely from the track. This causes some of the signals to be dropped out, and in the case of control signals that are to be counted, this has an unacceptable influence on the count.

It has been proposed, in order to overcome the disadvantage of losing contact with the control tracks, to place the control tracks near the center of the tape. As before, one-half of the tape is used to record one main intelligence signal and its corresponding secondary, or control, signal while the tape moves in one direction and the other half is used to record a second main intelligence signal and its related secondary signal when the tape is moved in the other direction. The two control signals are recorded adjacent each other and the main signals are recorded in broader tracks near the outer edges of the tape. However, this still produces cross-talk between each of the main information signals and the respective secondary signals because each pair of main and secondary signals is spaced only a very short distance apart. In addition, the magnetic head to accomplish such spacing is difficult to construct because the part that records the second signal must be relatively close to the part that records the main signal.

OBJECTS AND SUMMARY OF THE INVENTION

The principle object of this invention is to overcome the problems still found in recording both the main information signal and the corresponding secondary signal on tracks on one side of the center line of the magnetic tape and recording the second main signal and the corresponding secondary signal on tracks on the other side of the center line of the magnetic tape.

In accordance with this invention the recording is carried out so that there is enough space between the first main track on which the first main information signal was recorded and the corresponding secondary track to allow the second secondary track to be placed in that space with relatively narrow guard bands between the second secondary track and the first main track and between the second secondary track and the first secondary track. In addition, the second main track is separated from its secondary track by the first secondary track. The resultant tracks form an interleaved pattern consisting of a first main track, a second secondary track, a first secondary track and a second main signal. Typically, the first main track and the first secondary track are recorded with the tape moving in one direction and the second main track and its second secondary track are recorded with the tape moving in the opposite direction. This, in itself, reduces cross-talk between the two main tracks and the nearest secondary track.

BRIEF DESCRIPTION OF THE DRAWINGS

The invention will be described in greater detail in connection with the following drawings in which:

FIG. 5A shows a length of tape with another pattern recorded thereon in accordance with this invention and having two main tracks for each secondary track.

FIG. 5B shows a magnetic recording head for producing the recording pattern illustrated in FIG. 5A.

FIG. 5C shows an erasing head for erasing both sections of the main track and the corresponding secondary track recorded according to the pattern in FIG. 5A.

DETAILED DESCRIPTION OF THE INVENTION

Figure 1:
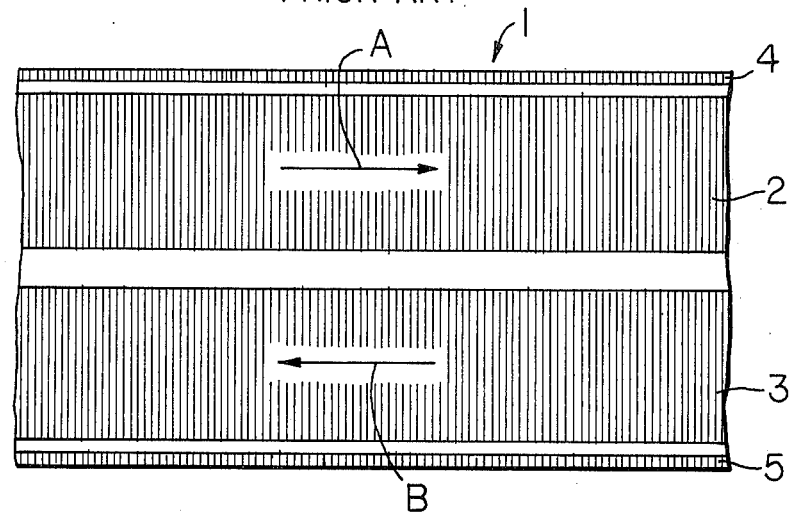
FIG. 1, including A and B, shows a short length of magnetic recording tape with first and second main tracks and first and second secondary tracks recorded thereon in accordance with the prior art.

FIG. 1 shows one pattern of recordings carried out by prior art tape recorders. In FIG. 1 the tape is indicated by reference numeral 1 and has recorded thereon a first main track 2 containing an information signal. This track is recorded in what may conventionally be called the forward direction as shown by the arrow A. The tape also includes another main track 3 substantially identical with track 2 but recorded with the tape moving in the reverse direction as indicated by the arrow B. A much narrower secondary track 4 is recorded alongside the main track 2 and between the track 2 and the closest edge of the tape 1. A second secondary track 5 corresponding to the second main track 3 is recorded between that main track and the closest edge of the tape 1. The tracks 2 and 4 are recorded simultaneously as are the tracks 3 and 5. One use for such secondary tracks is to record control signals to control the operation of playback mechanisms. The track 4 may have recorded on it control signals to control the operation when the tape 1 is moving in the forward direction. The track 5 may have control signals recorded on it to control the operation of the playback mechanism when the tape 1 is moving in the reverse direction to play back the second main, or information, signal 3.

The width of the tape 1 is typically ¼ inch, or about 6.3mm, and the width of the secondary tracks 4 and 5 are each about 0.2mm. Thus, if the tape moves transversely or vibrates when it is in motion in either direction the contact of the playback head that is to engage the secondary track is likely to be unstable, thereby causing drop outs of the signals played back from the secondary tracks. Such signals are likely to be control signals and thus to result in erratic and undesirable control operation.

Figure 2:
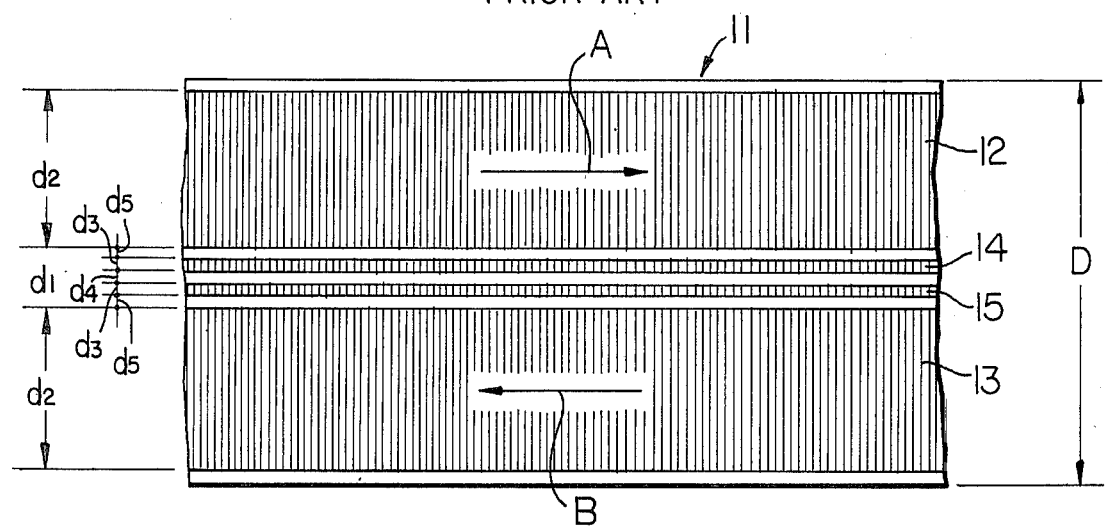
FIG. 2, including A and B, shows another prior art tape pattern in which the two secondary tracks are recorded between the two main tracks.

It has previously been proposed to overcome this difficulty by recording the secondary tracks between the main tracks as shown in FIG. 2. The tape in FIG. 2 is indicated by reference numeral 11 and is provided with main tracks 12 and 13 corresponding to tracks 2 and 3 in FIG. 1. Track 12 is recorded with the tape moving in the forward direction as indicated by the arrow A and track 13 is recorded with the tape moving in the reverse direction indicated by the arrow B. A secondary, or control, signal related to the information in track 12 is recorded in a very narrow track 14 directly alongside the track 12 and between the two main tracks 12 and 13. Similarly, a secondary, or control, signal related to the information in track 13 is recorded in a very narrow track 15 directly alongside the track 13 and between the latter and track 14.

FIG. 2 shows accepted track dimensions and spacings for recording tape having an overall width D of 6.3mm(¼ inch). The width $d_1$ between the nearest edges of the tracks 12 and 13 is 1.05mm., and the width $d_2$ of each of the main tracks 12 and 13 is 2.55mm. The width $d_3$ of each secondary track is 0.2mm. The spacing $d_4$ between the tracks 14 and 15 is also 0.2mm., and the spacing $d_5$ between each control track 14 or 15 and its respective main track 12 or 13 is 0.225mm.

Generally, a combination recording and playback transducer is used for recording or reproducing both an information signal and its associated secondary signal simultaneously. However, if the information track and the associated secondary track are formed close to each other, as described above, the information head core and the secondary head core that form these tracks must be located very close to each other. This makes it possible for magnetic coupling between the head cores to cause an undesirable amount of crosstalk, which causes deterioration in the quality of the reproduced information signal.

Figure 3:
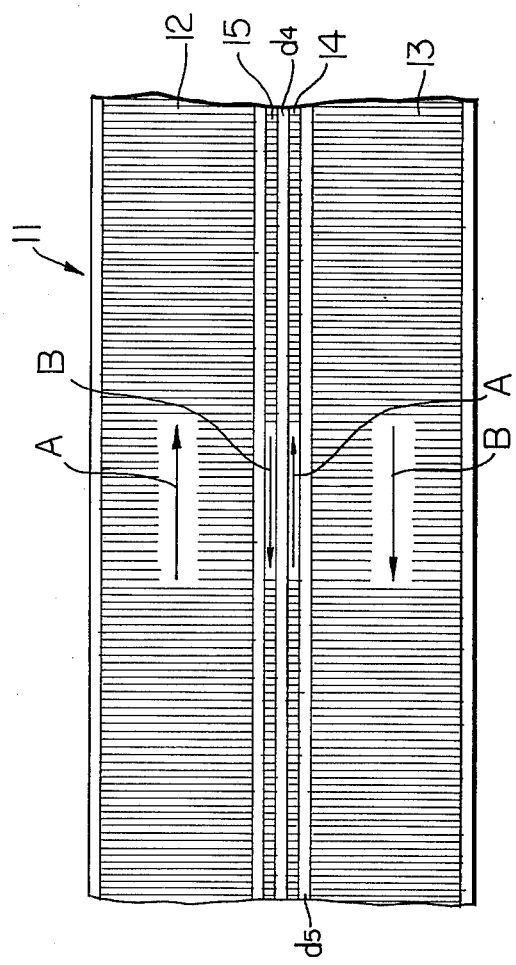
FIG. 3 shows a recording made by carrying out the steps of the method of the present invention and recording each secondary track between the other main track and the secondary track that corresponds to the other main track.

One embodiment of the present invention will be described with reference to FIG. 3. The fundamental difference between the arrangement of tracks in FIGS. 2 and 3 is that the location of the secondary tracks are reversed. In FIG. 3 the secondary track 14 associated with the main information track 12 is not adjacent track 12 but is separated from it by the secondary track 15. Correspondingly, the track 14 is located between the other secondary track 15 and the main information track 13 associated with the track 15. The relationship between the main and secondary tracks is clarified by the arrows A, which indicate that the tracks 12 and 14 are recorded when the tape 11 is moving in the forward direction and the arrows B that indicate that the tracks 13 and 15 are recorded when the tape is moving in the reverse direction.

There still remains a guardband between each pair of tracks. However, the guardband between the secondary tracks 14 and 15 can be even narrower than the guardbands between the tracks 12 and 15 and between the tracks 13 and 14.

Figure 4:
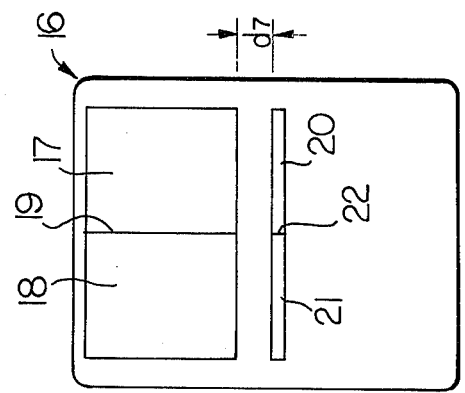
FIG. 4 shows a magnetic recording head used in carrying out the method of the present invention and having main and secondary sections spaced apart according to this invention.

FIG. 4 shows the face of a combination magnetic head 16 to record or reproduce information according to the track format shown in FIG. 3. The head 16 has a relatively wide pair of pole pieces 17 and 18 that meet at an air gap 19. The length of the air gap is equal to the width of the track 12 in FIG. 3 and the width of the air gap is infinitesimal. Spaced from the pole pieces 17 and 18 are two much narrower pole pieces 20 and 21 that define another air gap 22 between them and directly aligned with the air gap 19. The spacing between the closest edges of the upper pole pieces 17 and 18 and the lower pole pieces 20 and 21 is $d_7$ which is approximately equal to the sum of distances $d_3 + d_4 + d_5$ in FIG. 2, or approximately 0.625 mm. The relatively large spacing between the upper and lower pole pieces makes it easier to construct the magnetic head 16 than if this spacing were only 0.2mm. as it had to be in the case of the prior art arrangement to record the main track 12 and the corresponding secondary track 14 very close to each other as was done in FIG. 2. Additionally, the wide spacing $d_7$ greatly reduces the crosstalk between the upper poles 17 and 18 and the lower poles 20 and 21.

FIG. 5A shows another tape format similar to that in FIG. 3 except that the first main information track 12 has been divided into two subtracks 12a and 12b, each of which can carry information. In a similar manner the other main information track 13 has been divided into two subtracks 13a and 13b. Both of the subtracks 12a and 12b and the secondary track 14 associated with them are recorded when the tape 11 is traveling in the forward direction as shown by the arrows A. The other two subtracks 13a and 13b and the secondary track recorded along with them are recorded when the tape 11 is moving in the reverse direction indicated by the arrows B. Each of the subtracks 12a, 12b, 13a and 13b has a width of approximately 1.1mm. Each pair of subtracks, for example the pair 12a and 12b, has a guardband $d_9$ of approximately 0.35mm between them. The tracks 13a and 13b have this same guardband $d_9$ of about 0.35mm between them also. It will be noticed that the guardband width of 0.35mm is slightly larger than the guardband widths $d_5$ or $d_6$, each of which is 0.225mm or $d_4$ which is 0.2mm.

In order to record the track format illustrated in FIG. 5A a combination magnetic head is used. This head includes two pole pieces 24 and 25 with an airgap 26 between them to record the subtrack 12a when the tape 11 is moving in one direction and the track 13a when the tape 11 is reversed and moved in the opposite direction. The head includes a second set of pole pieces 27 and 28 defining a second airgap 29 exactly aligned with the airgap 26 to record the subtrack 12b and, in the reverse direction, the subtrack 13b. The secondary track 14 related to the subtracks 12a and 12b is recorded by a third pair of pole pieces 30 and 31 defining a third gap 32 therebetween. This gap is directly aligned with the airgaps 26 and 29. The same pole pieces may be used to playback the tracks previously recorded by the head 23 or an identical head. The pole pieces 30 and 31 are still spaced by the distance $d_7$ from the closest side of the closest pair of pole pieces 27 and 38 to make it as easy as possible to construct the head and to make it possible to reduce cross-talk between the nearest set of pole pieces 27 and 28 and the pole pieces 30 and 31 that record or playback the secondary track that corresponds to the main information signals recorded on the subtrack 12b.

FIG. 5C shows an erasing head 33 having only two main pole pieces 34 and 35 defining an airgap 36 therebetween and having an overall airgap length equal to the width of the subtracks 12a and 12b and the guardband between them. The erase head 33 also includes another pair of pole pieces 37 and 38 with an airgap 39 between them to erase the secondary track that corresponds to the main information track or subtracks being erased by the flux between the pole pieces 34 and 35. The pole pieces 37 and 38 must be spaced from the closest edge of the erasing pole pieces 34 and 35 by the same distance $d_7$ referred to previously.

This invention has been described in terms of specific embodiments although it will be understood by those skilled in the art that other embodiments may be used instead, and that the true scope of the invention is defined by the following claims.

What is claimed is:

1. The method of recording a plurality of main signals and a corresponding plurality of secondary signals of a control nature related to said main signals, said main signals and said secondary signals being recorded in parallel tracks on a recording medium, said method comprising the steps of:

recording at least one first main track and a corresponding first secondary track spaced apart from each other, said first main track being wider than said corresponding secondary track; and recording at least one second main track and a second secondary track also spaced apart from each other, said second main track being wider than said second secondary track, said first secondary track being recorded in the space between said second secondary track and said second main track and said second secondary track being recorded in the space between said first secondary track and said first main track, with all of said tracks being separated from each other by guardbands.

2. The method according to claim 1 in which said secondary tracks are recorded with a first guard band between them, a second guard band between said first main track and said second secondary track, and a third guard band between said second main track and said first secondary track, the width of said first guard band being narrower than the width of either of said second or third guard bands.

3. The method according to claim 1 in which said at least one first and second main tracks each are divided longitudinally into at least first and second sub-main tracks spaced apart from each other by an additional guardband distance, said first and second secondary tracks being recorded in the space between the proximal edges of the sub-main tracks closest to each other.

4. The method according to claim 3 in which the guard bands defined by the spacing between the two sub-tracks into which each said main track is divided are wider than the guard band between each of said secondary tracks and the edge of the next adjacent sub-track of a main track.

5. The method of claim 1 in which said recording medium is magnetic tape and all of said tracks are recorded longitudinally along said tape, said method comprising the additional steps of:

moving said tape longitudinally in a first direction while recording said first main track and said first secondary track; and moving said tape in the opposite direction during the recording of said second main track and said second secondary track.

6. The method according to claim 5 in which said first main track and said second secondary track are recorded with spacings of mirror symmetry with respect to said second main track and said first secondary track, the line of symmetry being centered between said first and second secondary tracks.

7. The method according to claim 5 in which said first and second secondary tracks are recorded with a first guard band spacing between them, said first secondary track being recorded with a second guard band spacing between itself and said first main track, said second secondary track being recorded with said second guard band spacing between itself and said second main track, said first guard band being narrower than said second guard band.

* * * * *